UNITED STATES PATENT OFFICE.

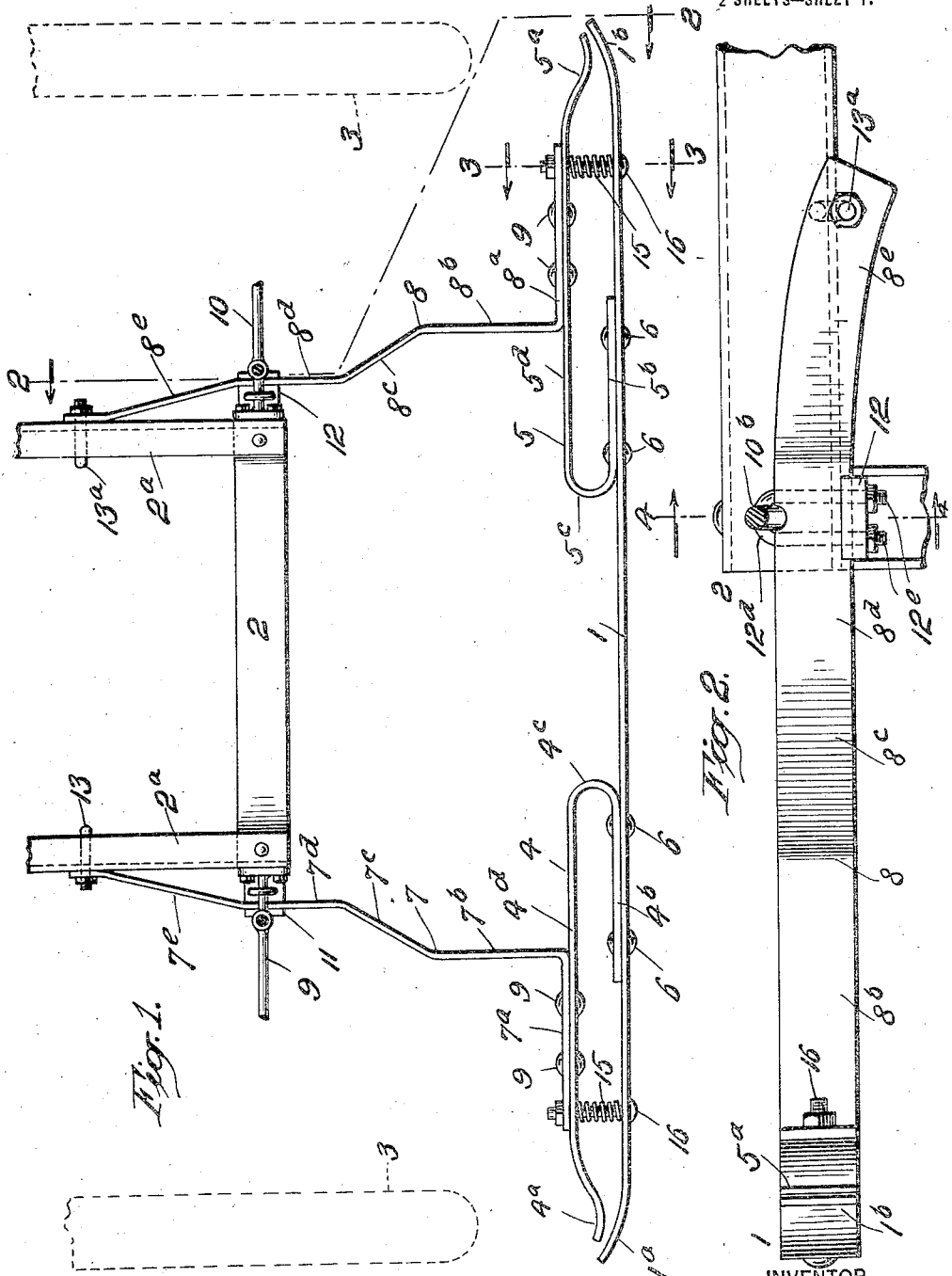

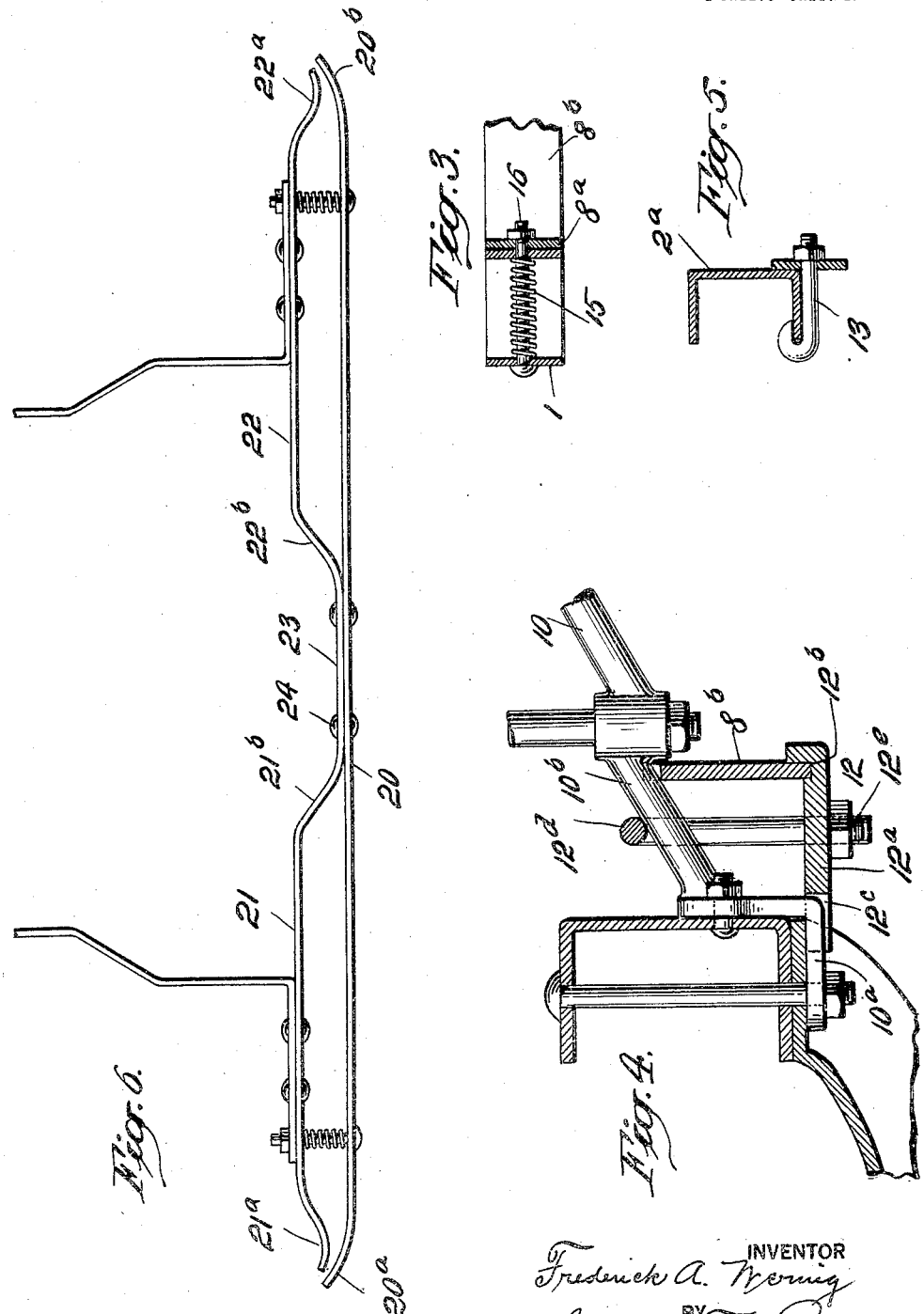

FREDERICK A. WERNIG, OF BROOKLYN, NEW YORK, ASSIGNOR TO NEW YORK WIRE & SPRING COMPANY, A CORPORATION OF NEW JERSEY.

AUTOMOBILE BUMPER.

1,424,699.   Specification of Letters Patent.   Patented Aug. 1, 1922.

Application filed October 5, 1921. Serial No. 505,601.

*To all whom it may concern:*

Be it known that I, FREDERICK A. WERNIG, a citizen of the United States, and a resident of the borough of Brooklyn, county of Kings, and State of New York, have invented certain new and useful Improvements in Automobile Bumpers, of which the following is a specification.

This invention relates to improvements in automobile bumpers.

One of the objects of this invention is to produce an automobile bumper which will be efficient in performing its function of absorbing shocks from collisions and the like and which may be manufactured at a low cost.

Another object of my invention is to produce a bumper in which the resilience of the flat-spring members is enhanced by having free ends.

Another object of my invention is to prevent rattling between said free ends and contiguous parts; to supplement the action of such flat spring at such free ends in taking up relatively light shocks and to resist and deaden the shock of concussion in the transmission of relatively heavy shocks at such free ends.

Another object of my invention is to produce a bumper in which a coiled spring is so combined with a flat spring as to act as a buffer and anti-rattling device between resiliently movable terminal parts.

Another object of my invention is to produce a bumper of the type specified in which the parts are so arranged that the free end of the flat spring will be utilized to take up shocks of greater magnitude than can be taken up by the buffer coiled spring.

Another object of my invention is to produce a bumper of the flat spring type in which the tempered areas of the spring parts will be relatively limited, whereby the cost of the manufacture of the bumper will be materially reduced.

In the preferred embodiment of my invention I produce a bumper having an impact bar extending transversely across the front of the car body and having terminal portions projecting at opposite ends thereof and curved inwardly; supporting members for said bar including flat spring arms of relatively thin light metal which extend in opposite directions, have portions connected to the impact bar intermediate its ends and terminal portions extending in the same direction and terminating in abutment portions adjacent to and substantially parallel with the opposite terminal portions of the impact bar and coiled springs interposed between the terminal portions of the impact bar and the terminal portions of said spring arms.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of an automobile bumper embodying my invention attached to a car of well known make and low price;

Fig. 2 is a side view on the line 2—2 of Fig. 1, looking in the direction of the arrow;

Fig. 3 is a section on the line 3—3 of Fig. 1 looking in the direction of the arrow;

Fig. 4 is a section on the line 4—4 of Fig. 2, looking in the direction of the arrow;

Fig. 5 is a detail view of the connection between the side rails of the car body and the ends of the brackets of the bumper;

Fig. 6 is a plan view of the device embodying a modified form of my invention.

Referring now to these drawings, and particularly to Figs. 1 to 5 inclusive, 1 indicates an impact bar which, as shown, extends transversely across the automobile body 2 and wheels 3 and has at its opposite ends terminal portions $1^a$—$1^b$ which are curved inwardly and preferably terminate at the outer side of planes passing through the front wheels. The impact bar 1, in the embodiment shown, is supported by supporting members including a pair of spring arms 4 and 5 respectively which may be formed of relatively thin light metal and preferably are so formed as to require a minimum amount of tempering. As shown, the said spring arms are connected to said impact bar 1 intermediate the ends of said bar and have terminal portions $4^a$—$5^a$ extending in the direction of the terminal portions of the impact bar, and such spring terminal portions are preferably curved outwardly toward and into contiguity with said bar and then inwardly substantially parallel with said bar terminals, the said terminal portions of the bar and spring preferably being slightly spaced from each other. As illustrated in Fig. 1, the spring arms 4 and 5 have inner ends 4$^b$—5$^b$ abutting against the impact bar 1 and are connected thereto by rivets 6; return loop portions 4$^c$—5$^c$; laterally-extending portions 4$^d$—5$^d$ which extend substantially parallel to the impact bar 1 and terminal portions 4$^a$—5$^a$, which, as aforesaid, terminate adjacent to the opposite curved ends 1$^a$—1$^b$ of the impact bar.

The impact bar 1 and spring arms 4 and 5 are supported from the body of the car by connecting arms 7 and 8 respectively. These arms 7 and 8, as shown, have a series of bends, thus they preferably have laterally-extending portions 7$^a$—8$^a$ which abut against the laterally-extending portions 4$^d$—5$^d$ of the springs and are connected thereto by rivets 9; straight extension portions 7$^b$—8$^b$ extending inwardly; inclined extension portions 7$^c$—8$^c$; straight connecting portions 7$^d$—8$^d$ which preferably extend beneath the lamp brackets 9 and 10, respectively, of the car and are fastened beneath and to the said lamp bracket to the body of the car by clamp brackets 11 and 12; and terminal connection portions 7$^e$—8$^e$ inclining from the lamp bracket inwardly toward and abutting at their ends against the side rails 2$^a$ of the car, to which side rails such ends are fastened by means of hook bolts 13—13$^a$.

The clamp brackets 11 and 12 and the fastening connection thereof with the lamp brackets are identical and I have therefore illustrated only one of same in detail. Thus in Fig. 4, the fastening of the bumper connection bar to the lamp bracket at one side of the car is shown, and in said figure the clamp brackets 12 comprise a base plate 12$^a$ having a groove 12$^b$ for the reception of the bottom edge of a bracket bar 8$^b$ and a bifurcated or cut out end 12$^c$ adapted to fit over and engage the base portions 10$^a$ of the lamp bracket 10 at opposite sides thereof. Said base plate 12$^a$ is connected to the outwardly inclined rod 10$^b$ of the lamp bracket 10 by a U-bolt 12$^d$ which fits over such inclined rods and are connected to the said base plates by thread and nut connections 12$^e$. It will be seen that when the clamps 11 and 12 are similarly so adjusted the bracket bar portions 7$^d$—8$^d$ may be securely locked in place beneath the lamp brackets 9 and 10 and are likewise securely fastened to the side rails 2$^a$ of the car body.

When the connecting bars 7 and 8 are so connected to the car body a firm support will be provided and the bumper will be retained rigidly in position.

When the terminal end portions 4$^a$—5$^a$ of the springs 4 and 5 and the terminal ends 1$^a$—1$^b$ of the impact bar are arranged as herein shown and described, the impact member or portion will have relatively great resilience or constructions in which such ends are looped or connected by rivets or bolts and in order to retain this increased or enhanced resilience to the greatest possible extent I preferably cause such ends to be retained in spaced relationship from each other by means of coiled springs 15 which are preferably seated upon bolts 16 and interposed between the spring arms 4 and 5 and the impact bar 1 under tension. The terminal portions of such bars are thus retained in spaced relationship from each other while maintaining in a great degree the enhanced resilience of such members, and furthermore this coiled spring connection prevents rattling, takes up any light shocks or strains which may be imparted to the impact bar 1 by collisions or the like and acts as a buffer to deaden the shock of concussion between such ends when shocks or strains of greater magnitude than the strength of the spring is imposed on the bumper.

It will be understood that when the strain or shock of a collision is imposed on the bar 1 the coiled expansion springs 15 will take up the first shock till they are collapsed, after which the ends of bar 1 will abut against the terminal portions 4$^a$—5$^a$ of the springs 4 and 5 respectively, and any further strain on the impact bar will be taken up and resiliently resisted by the curved ends 4$^a$—5$^a$ of the spring arms 4 and 5.

In Fig. 6, I have shown a construction in which an impact bar 20 having outwardly projecting terminal portions 20$^a$—20$^b$ is supported by supporting members including spring arms 21—22 having laterally projecting terminal portions 21$^a$—22$^a$, and raised spring portions 21$^b$—22$^b$. These two spring arms are formed integrally with a central portion 23 which is connected to the impact bar between ends by rivets 24. In other respects the construction is the same as the constructions shown and described in Figs. 1 to 5.

Having described my invention, I claim:—

1. An automobile bumper embodying a front portion movable by the impact of a collision, flat spring arms arranged at the rear of said front portion and having free ends and independent resilient means for connecting said free ends with the movable front portion.

2. An automobile bumper embodying a front portion movable by the impact of a collision, flat spring arms arranged at the rear of said front portion and having free ends and coiled springs connecting such free ends with the movable front portion.

3. An automobile bumper embodying a front portion movable by the impact of a collision; flat spring arms arranged at opposite sides of the midplane of the car and extending in opposite directions, said flat springs having free ends arranged at the rear of said movable front portion and coiled springs arranged as buffer members between such free ends of the spring arm and said movable front portion of the bumper.

4. An automobile bumper comprising a plurality of members arranged to provide two free ends, one behind the other, at each of the opposite ends of the bumper and resilient connecting means arranged intermediate the ends of the bumper and connecting the aforesaid two free ends.

5. An automobile bumper comprising a plurality of members arranged to provide two free ends, one behind the other, at each of the opposite ends of the bumper and resilient connecting means arranged intermediate the ends of the bumper and connecting the aforesaid two free ends, said oppositely disposed free ends being bent in substantial parallelism.

6. An automobile bumper comprising a plurality of members arranged to provide two free ends, one behind the other, at each of the opposite ends of the bumper and resilient connecting means arranged intermediate the ends of the bumper and connecting the aforesaid two free ends, the said free ends at opposite ends of the bumper being curved rearwardly in substantial parallelism and spaced from each other.

7. An automobile bumper comprising a plurality of members arranged to provide two free ends, one behind the other, at each of the opposite ends of the bumper and resilient connecting means arranged intermediate the ends of the bumper and connecting the aforesaid two free ends and comprising a coiled spring connecting said two free ends at opposite sides of the bumper.

8. An automobile bumper comprising a plurality of members arranged to provide two free ends, one behind the other, at each of the opposite ends of the bumper, said oppositely disposed free ends being bent in sustantial parallelism and a coiled spring connecting said two free ends at opposite sides of the bumper.

9. An automobile bumper comprising a plurality of members arranged to provide two free ends, one behind the other, at each of the opposite ends of the bumper, the said free ends at opposite ends of the bumper being curved rearwardly in substantial parallelism and spaced from each other and a coiled spring connecting said two free ends at opposite sides of the bumper.

10. An automobile bumper comprising a plurality of members arranged to provide two free ends, one behind the other, at each of the opposite ends of the bumper, and a coiled expansion spring arranged under tension between said two free ends at opposite sides of the bumper to separate the same, prevent rattling therebetween and act as a buffer.

11. An automobile bumper embodying, in combination, an impact member extending transversely across the front of the car body and having terminal portions projecting at opposite sides thereof and supporting means for opposite ends of said member, including spring arms connected to said impact member intermediate the ends thereof and having portions spaced from such member and terminal portions extending in the direction of the terminal portions of the impact member.

12. An automobile bumper embodying, in combination, an impact member extending transversely across the front of the car body and having terminal portions projecting at opposite sides thereof and supporting means for opposite ends of said member, including spring arms connected to said impact member intermediate the ends thereof and having portions spaced from such member and terminal portions extending in the direction of the terminal portions of the impact member and coiled springs arranged between the terminal portions of the impact member and said spring arms.

13. An automobile bumper embodying, in combination, an impact bar extending transversely across the front of the car body and having terminal portions projecting at opposite sides thereof and supporting means for opposite ends of said bar, including spring arms connected to said impact bar contiguous to the central portion thereof and looped in opposite directions, having portions extending substantially parallel to said impact bar and spaced therefrom.

14. An automobile bumper embodying, in combination, an impact bar extending transversely across the front of the car body and having terminal portions projecting at opposite sides thereof and supporting means for opposite ends of said bar, including spring arms connected to said impact bar contiguous to the central portion thereof and looped in opposite directions, having portions extending substantially parallel to said impact bar and spaced therefrom and coiled springs arranged between the terminal portions of the impact bar and said spring arms.

In witness whereof, I have signed my name to the foregoing specification in the presence of two subscribing witnesses.

FREDERICK A. WERNIG.

Witnesses:
 HELEN V. WHIDDEN,
 JULIUS M. LUTZ.